United States Patent [19]

Howey

[11] Patent Number: 5,311,389
[45] Date of Patent: * May 10, 1994

[54] HYDROENTANGLED FABRIC DISKETTE LINER

[75] Inventor: Jon A. Howey, Mansfield, Mass.

[73] Assignee: International Paper Company, Purchase, N.Y.

[*] Notice: The portion of the term of this patent subsequent to Oct. 22, 2008 has been disclaimed.

[21] Appl. No.: 776,537

[22] Filed: Oct. 15, 1991

Related U.S. Application Data

[63] Continuation-in-part of Ser. No. 509,533, Apr. 16, 1990, Pat. No. 5,060,105.

[51] Int. Cl.$^5$ .................. G11B 23/03; G11B 23/50; D04H 1/58; B32B 5/06
[52] U.S. Cl. .................................... 360/133; 28/104; 206/444; 428/288; 428/290; 428/299
[58] Field of Search ............... 360/133; 28/104, 105; 206/444; 428/288, 290, 299

[56] References Cited

U.S. PATENT DOCUMENTS

| | | | |
|---|---|---|---|
| 4,106,067 | 8/1978 | Masuyama et al. | 360/133 |
| 4,476,186 | 10/1984 | Kato et al. | 28/104 |
| 4,735,842 | 4/1988 | Buyofsky et al. | 28/105 |
| 4,791,516 | 12/1988 | Seto | 360/133 |
| 4,845,583 | 7/1989 | Zimmerman et al. | 360/133 |
| 4,891,262 | 1/1990 | Nakamae et al. | 28/104 |
| 4,897,752 | 1/1990 | Doi et al. | 360/133 |
| 4,960,630 | 10/1990 | Greenway et al. | 28/105 |

FOREIGN PATENT DOCUMENTS

| | | |
|---|---|---|
| 0411752 | 2/1991 | European Pat. Off. |
| 30272 | 2/1984 | Japan |
| 145581 | 8/1985 | Japan |
| 80576 | 4/1986 | Japan |
| 164283 | 7/1987 | Japan |
| 146284 | 6/1988 | Japan |

Primary Examiner—A. J. Heinz
Assistant Examiner—Jefferson Evans
Attorney, Agent, or Firm—Ostrager, Chong & Flaherty

[57] ABSTRACT

A nonwoven liner for a diskette cartridge is made of hydroentangled fibers and impregnated with a small amount of binder which is uniformly distributed throughout the fabric. The binder comprises no more than 5% by weight and preferably between 1.5-3.0% by weight of the fabric. The low concentration of binder ensures that the liner surface does not become totally coated with plastic film that reduces cleaning ability, while also providing improvements in tensile strength and debris reduction. The binder solution preferably has a high surface tension (low surfactant level), so that the binder becomes concentrated at the junction points of the fibers throughout the fabric. The low level of surfactant ensures a low risk of chemical attack of the disk media surface. The hydroentangled fabric cleans the disk media more efficiently, has less fiber debris, contains less environmental contaminants, is substantially loftier, and is cut with cleaner edges than standard thermally bonded diskette liners.

20 Claims, 5 Drawing Sheets

HYDROENTANGLED FABRIC DISKETTE LINER

This application is a continuation-in-part of U.S. patent application No. 07/509,533 of the same inventor, filed Apr. 16, 1990, entitled "Hybrid Nonwoven Diskette Liner", which issued as U.S. Pat. No. 5,060,105 on Oct. 22, 1991.

FIELD OF THE INVENTION

This invention generally relates to a nonwoven liner for use in a diskette cartridge, and in particular, to a diskette liner made of hydroentangled fabric.

BACKGROUND ART

Disks are presently employed to store information in digital form on the surface of a recording medium layer formed on the disk. The information can be recorded on (written to) or read from the recording surface by magnetic, magneto-optic or optic systems. In a typical system it is intended that the information stored on these disks be retrieved and loaded into a computer system quickly and easily without error. It has been found that magnetic particles as well as seemingly innocuous things such as fingerprints, dust particles or smoke particles can contaminate a disk and cause a read/write head to bounce over the contamination and disrupt the flow of information. This misreading of information is often referred to as "dropout" and is one of the most serious problems encountered in transferring information between a disk drive and a computer.

To overcome the dropout problem, disk cartridges are designed to provide a substantially closed and dust free environment for the disk. However, contaminants can infiltrate the disk through the hub or read/write window of the cartridges. Thus it is desirable to include a liner within the cartridge placed in contact with the disk to remove wear particles from the magnetic surface as well as other contaminants from the surface of the disk.

It is known to form a diskette liner from nonwoven fibers bonded together with an adhesive binder. Examples of such adhesive-bond liners can be found in U.S. Pat. Nos. 4,251,843 to Masuyama, and 4,354,213 and 4,419,164 to Martinelli which typically contain between twenty (20) and fifty (50) percent by weight of binder to achieve a bonding strength sufficient to maintain fabric integrity. The high amount of binder in adhesive-bond liners tends to coat the fibers with a plastic film, which results in a low cleaning ability. It also requires that binders of low glass transition temperature be used, in order to avoid excessive stiffness, but the tradeoff is reduced durability. It also requires conditioning chemicals, such as additional surfactants, anti-foams, and cross-linkers, to stabilize the binder solution, which presents a greater risk that such chemicals will be degraded (formaldehyde from cross-liners) or transported (surfactants and anti-foams made mobile by humidity) onto the disk media where they can cause damage or reduced durability.

Thermal-bond fabrics are also used for diskette liners, but they generally have a lower strength and stiffness and a higher level of debris. Also, significant amounts of free fiber pieces and other debris can come from the areas of the liner fabric that are cut during diskette manufacturing. U.S. Pat. Nos. 4,223,361 to Zaitsu, 4,414,597 to Cornin, 4,586,606 and 4,610,352 to Howey, 4,655,348 to Takagi, 4,680,661 to Oishi, and 4,803,584 to Doi show various improvements for reducing debris from and/or strengthening of thermal-bond liners by additional thermal bonding in or around the liner or through the use of stiffener layers or anti-dust layers or materials. The additional layers, dust prevention, and strengthening procedures tend to make the manufacturing process more costly and complicated.

U.S. Pat. No. 4,845,583 to Zimmerman discloses a powder-bonded nonwoven liner fabric which increases the strength and reduces the probability of debris from cut areas during diskette manufacturing. The powder is a thermoplastic adhesive material that is evenly deposited on a fiber web in an amount of approximately ten (10) to twenty (20) percent of the total fabric weight. Upon heating, the powder fuses and bonds the fibers of the web. The powder-bond fabric is deemed to have smaller and more widely distributed bond areas and a higher frequency of bond sites as compared with a thermal-bond fabric.

U.S. Pat. No. 4,791,516 to Seto discloses a treatment of a thermal-bond liner fabric with binder solution so that a higher concentration of the binder of about fifty (50) percent by weight of fabric is provided on the media-contacting side, and a lesser concentration of about five (5) percent is provided through the interior of the liner to the side adjacent the holder wall. Although it provides stiffness and reduced fibrous debris, the high level of binder at the media-contacting side tends to form a plastic coating that reduce cleaning ability. U.S. Pat. No. 4,998,176 also discloses a liner made of thermally bonded fibers which contains binder resin in an amount of up to 10% (5% used in the examples), in which more resin is present in the non-compression part than in the compression part of the fabric.

SUMMARY OF THE INVENTION

A principal purpose of the present invention is to provide a liner for a diskette cartridge of improved strength, dimensional stability, and cleaning ability without requiring additional or complicated treatments or manufacturing steps. Given the intimate contact between the disk and the liner, it is also desirable for the liner to be as free of debris and chemicals as possible to avoid contributing to dropout by contaminants on the disk surface.

In accordance with the present invention, a diskette liner is comprised of a nonwoven fabric made of fibers which are hydroentangled together and impregnated with a small amount of binder that is substantially uniformly distributed throughout the fabric in a low concentration that comprises no more than five (5) percent by weight and preferably between 1.5–3.0% by weight of the fabric.

The low concentration of binder ensures that the liner surface does not become coated with a plastic film that reduces cleaning ability. At the same time, the low amount of binder is found to provide a disproportionately high increase in tensile strength and dimensional stability The hydroentangled (HEF) fabric is found to clean the magnetic media surface more efficiently, have less debris, contain less environmental contaminants, are cut cleaner, and are substantially loftier than current types of thermally bonded diskette liners.

The invention also encompasses the method of fabricating a low debris nonwoven diskette liner fabric by bonding a web of nonwoven fibers, applying a binder solution to the bonded fabric having a high surface tension and a low concentration of binder, such that the binder does not constitute more than 5% by weight of the finished fabric, allowing the binder to bead on and be retained at the junction points of the fibers, then drying the binder-impregnated fabric.

Through the high surface tension (low surfactant) and low concentration in solution, the binder beads and becomes dried at junction points of the fibers and is evenly distributed throughout the fabric. The low level of surfactant and binder ensures a corresponding low level of associated chemicals to reduce the risk of chemical attack of the disk media surface.

Other objects, features and advantages of the present invention will become apparent from the following detailed description of the preferred modes and embodiments of the invention considered in conjunction with the drawings.

DETAILED DESCRIPTION OF THE INVENTION

The general principle or using a nonwoven fabric impregnated with a small amount of binder, preferably in the range of 1.5% to 3.0% by weight of fabric, in order to obtain a diskette liner of high cleaning ability, low debris, and disproportionately high increase in tensile strength and dimensional stability, was the subject of the related, copending U.S. patent application No. 07/509,533 of the same inventor. The present application is specifically directed to, and claims, the nonwoven diskette liner made of hydroentangled fabric, which is shown herein to have improved, advantageous properties.

Figure 1:
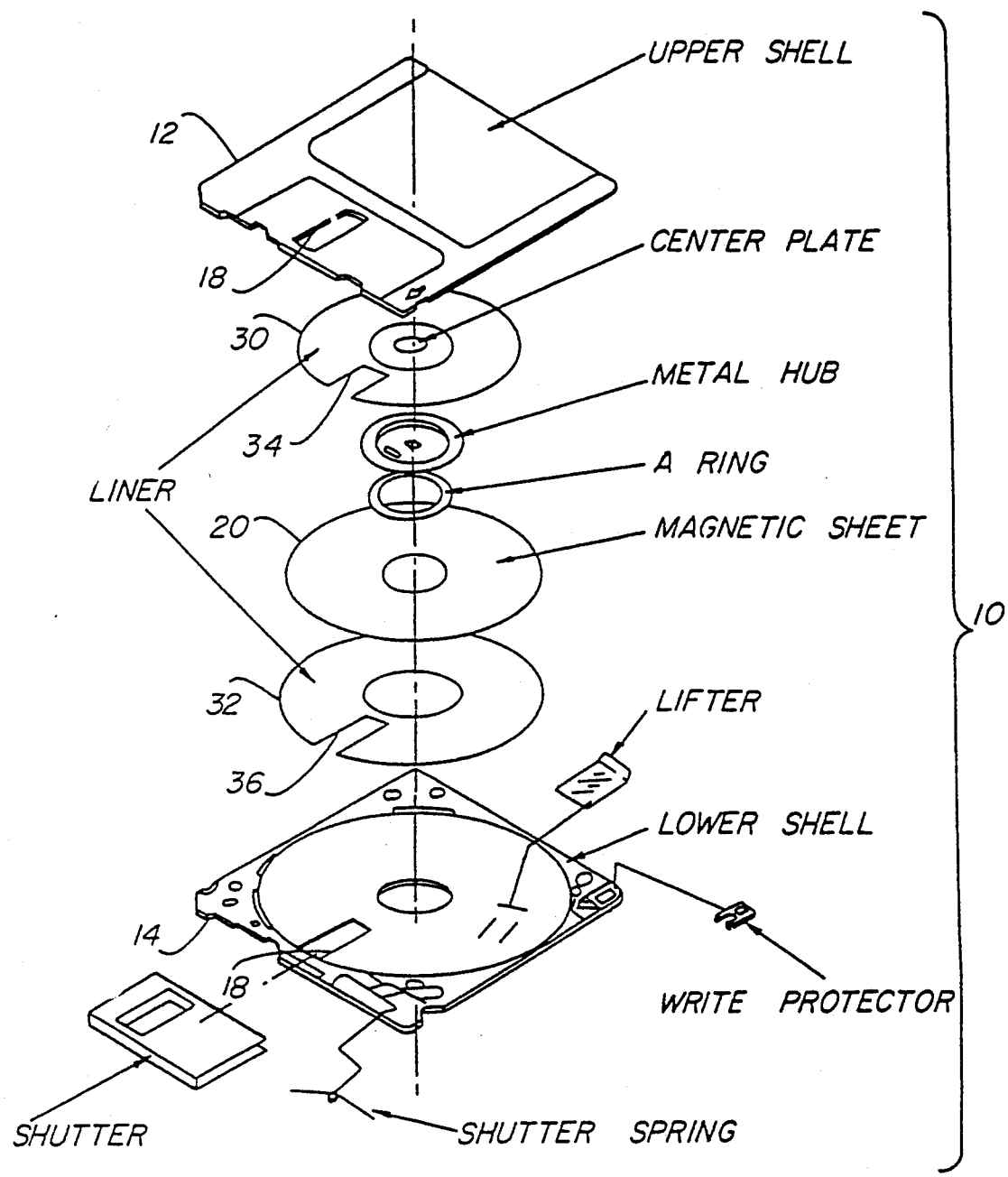
FIG. 1 is an exploded perspective view of a typical diskette cartridge employing diskette liners.

Referring to FIG. 1, a diskette cartridge 10 has an upper member 12 and a lower member 14. The disk 20 can be rotated by a mechanism which can for instance include a rim drive apparatus which drives a disk rim to rotate the disk 20. Alternatively, the disk 20 can include a hub for engaging a suitable hub drive mechanism disposed within the disk drive apparatus. One or both of the upper and lower members 12 and 14 of the disk cartridge 10 includes a cutout 18 for providing a read/write head access to the disk 20.

Liners 30 and 32 are provided on one or both sides between the disk 20 and the upper and lower members 12 and 14 of the holder 10. The liners 30 and 32 may be formed at least substantially coextensive with the recording surface of the disk 20 and with cutouts 34 and 36 similar to the cutouts 18 in the upper and lower members 12 and 14, respectively, for mating with the holder cutouts 18 and allowing for read/write head access therethrough. The liners 30 and 32 are fixed with respect to the cartridge 10 to avoid the possibility that it might become displaced and inadvertently cover the read/write head access through cutouts 18. The liners 30 and 32 are secured to the upper and lower members 12 and 14 in alignment with the cutouts 18, for instance, by employing thermal spot welding techniques.

Figure 2:
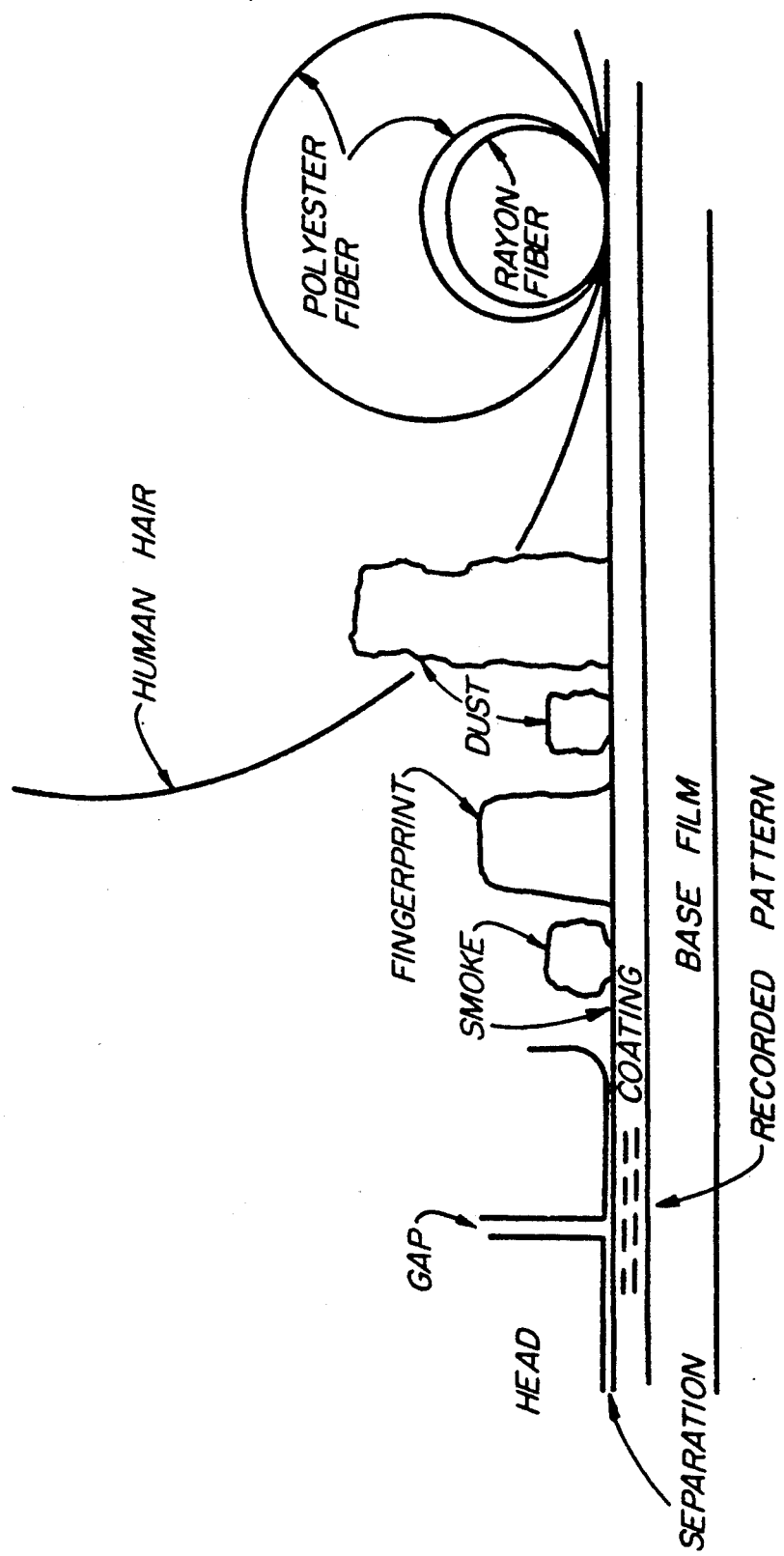
FIG. 2 illustrates the problem of contaminants on a disk media surface relative to a typical read/write head.

As illustrated in FIG. 2, fingerprints, smoke particles and debris or dust particles can potentially disrupt the close contact of a read/write head giving rise to data dropout. The liners 30 and 32 are therefore used to clean the contaminants and other particles from the recording media surface of the disk. It is particularly desired that the liner fabric have suitable strength and durability, yet have a media-contacting cleaning surface with high fiber surface area and a low amount of debris from broken or cut fibers.

Figure 3:
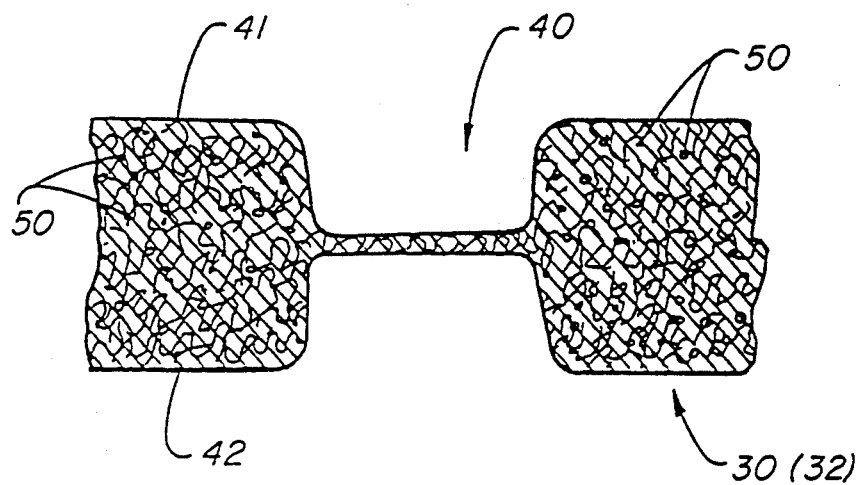
FIG. 3 is a cross-sectional diagram illustrating a thermally bonded diskette liner for purposes of comparison.

Referring to FIG. 3, an example of a thermally-bonded diskette liner 30 (32) is illustrated made of nonwoven synthetic fibers which are thermally spot welded at the thermal bond points 40 to form the basic liner fabric. In the prior U.S. patent application No. 07/509,533, a small amount of binder (compared to the weight of the fabric) is uniformly distributed throughout the fabric and is principally applied a the junction points of the fibers, indicated at 50. The binder comprises up to about 5%, and preferably between 1.5-3.0% by weight of the fabric.

Figure 6:
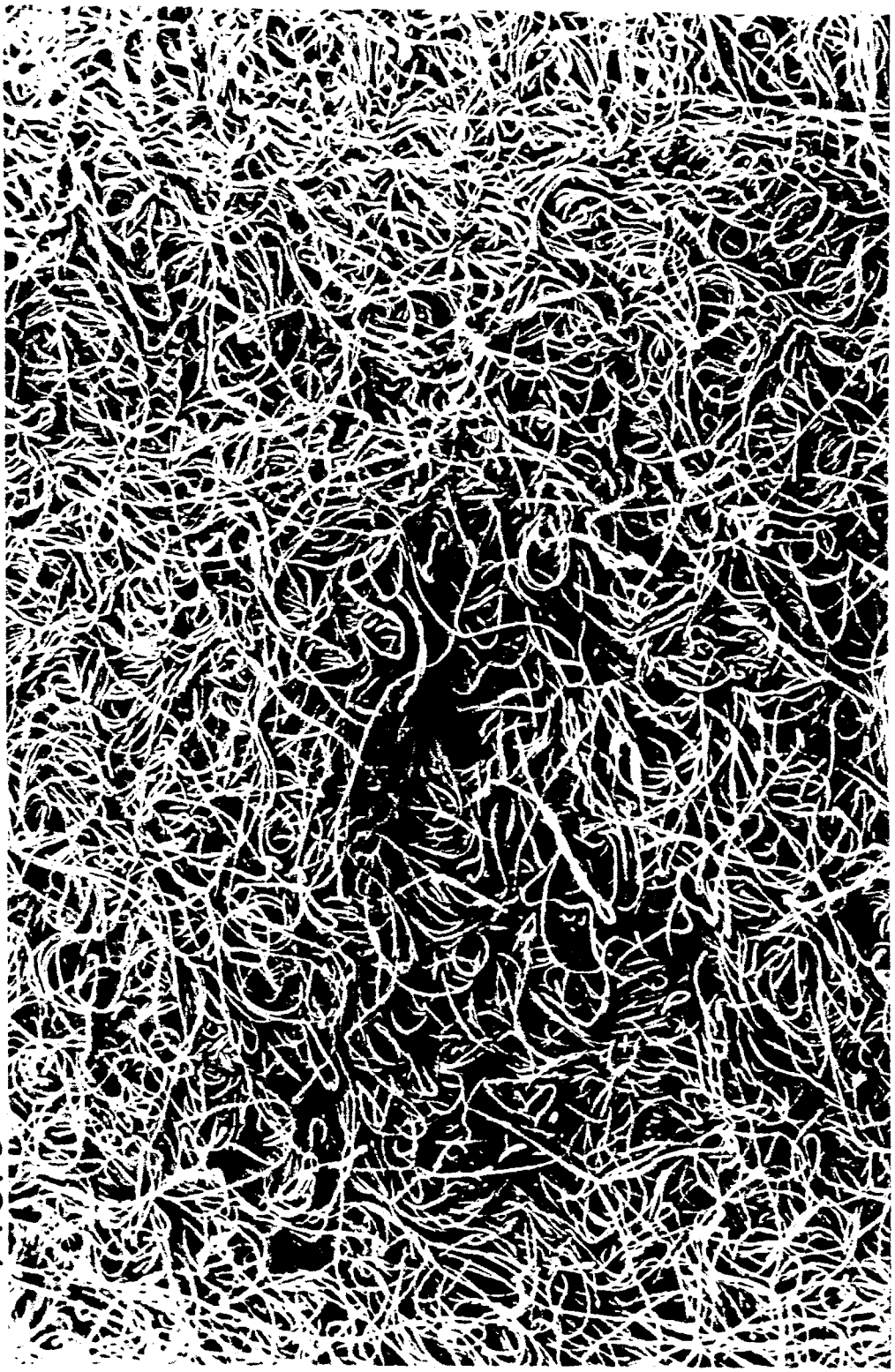
FIG. 6 is a magnified photograph showing the fiber structure of the hydroentangled diskette liner in accordance with the present invention.

In the present invention, hydroentangled fibers are used to form the base fabric. FIG. 6 illustrates the entangled structure of fibers obtained through hydroentanglement. The process of hydroentanglement of fibers to form a nonwoven fabric is well known, for example, as described in commonly owned U.S. Pat. No. 4,960,630 to M. Greenway, et al., entitled "Apparatus For Producing Symmetrical Fluid Entangled Non-Woven Fabrics And Related Method". The hydroentangled fibers are interentangled with each other to have a desired density of fiber junction points. A small amount of binder of up to about 5%, and preferably between 1.5-3.0%, is evenly applied throughout the HEF fabric, principally at the junction points of the fibers.

Suitable binders include styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA) polyvinyl alcohol, polyester (PET) and copolymers, elastomeric adhesives, and similar materials. The fibers of the fabric may be polypropylene, polyester, nylon, acrylic, cellulose acetate, rayon, cotton, wool, or bicomponent fibers or combinations thereof, or other synthetic or natural fibers.

The small amount of binder used in the invention reinforces the HEF fabric at the fiber junction points without totally coating the fibers or forming a plastic film at the surfaces of the fabric. Thus, the fabric maintains a high cleaning ability at the media-contacting surface. The invention seeks to avoid a high concentration of binder at the media-contacting side which would result in low cleaning ability and excessive stiffness. Debris that is normally generated from broken fibers at the bond points in thermally-bonded fabric, or from cut areas of the fabric, is substantially reduced when HEF fabric is used. Since the binder is evenly distributed throughout the liner, either side of the liner fabric may be used interchangeably for cleaning the disk media surface, thereby facilitating the diskette manufacturing process.

Table 1 below illustrates comparatively the physical properties of a thermally-bonded liner, made from 50% rayon fibers and 50% polyester fibers, having no binder treatment versus treatment with small amounts of different types of binder.

TABLE 1

PHYSICAL PROPERTIES OF THERMALLY BONDED LINER

|  | Control | 1.5% SBR | 2% PET | 2% PVA | 3% SBR |
|---|---|---|---|---|---|
| WEIGHT: | | | | | |
| (g/sq. yd.) | 29 | 32 | 31.8 | 30.2 | 31.4 |
| % Change* | — | 10% | 10% | 4% | 8% |
| TENSILE STRENGTH: | | | | | |
| MD (lb/in) | 2.9 | 4.0 | 5.7 | 6.5 | 6.0 |
| % Change | — | 38% | 97% | 124% | 107% |
| CD (lb/in) | 0.4 | 0.6 | 0.8 | 0.9 | 1.0 |
| % Change | — | 50% | 100% | 135% | 150% |
| FLEX. RIGIDITY: | | | | | |
| (Mg-cm) | 54 | 136 | 236 | 248 | 207 |
| % Change | — | 152% | 336% | 358% | 283% |
| DEBRIS: | | | | | |
| (%) By Weight | 0.062 | 0.042 | 0.037 | 0.028 | 0.029 |
| % Change | — | −32% | −40% | −55% | −53% |

*Note:
Some of the increase in density is due to fabric shrinkage when exposed to heat during the binder drying and curing process.

It is to be noted that significant and unexpected gains in strength, flexural rigidity (dimensional stability and stiffness for handling in manufacture), and debris reduction were obtained out of proportion to the small amount of binder used. For example, a 2% by weight addition of polyester binder produced roughly a 100% increase in machine-direction (MD) and cross-direction (CD) tensile strength, over 300% increase in flexural rigidity of the fabric, and a 40% reduction in debris from the fabric. A 1.5% addition of SBR binder produced a 50% increase in strength, a 150% increase in flexural rigidity, and a 30% debris reduction, while 3% SBR binder produced a 150% increase in strength, 300% increase in flexural rigidity, and a 50% debris reduction.

Table 2 illustrates comparatively the physical properties of a thermally-bonded liner, made from 75% rayon fibers and 25% polypropylene fibers, having no binder treatment versus treatment with different levels of the same SBR binder.

TABLE 2

PHYSICAL PROPERTIES OF THERMALLY BONDED LINER

|  | Control | 0.5% SBR | 1.5% SBR | 3.0% SBR | 5% SBR |
|---|---|---|---|---|---|
| WEIGHT: | | | | | |
| (g/sq. yd) | 30 | 30 | 30 | 31 | 31.5 |
| % Change* | — | — | — | 3% | 5% |
| TENSILE STRENGTH: | | | | | |
| MD (lb/in) | 3.0 | 4.3 | 5.3 | 9.2 | 9.6 |
| % Change | — | 43% | 77% | 207% | 220% |
| CD (lb/in) | 0.5 | 0.6 | 0.8 | 1.4 | 1.9 |
| % Change | — | 20% | 60% | 180% | 280% |
| FLEX. RIGIDITY: | | | | | |
| (Mg-cm) | 60 | 300 | 400 | 800 | 950 |
| % Change | — | 400% | 567% | 1233% | 1483% |
| DEBRIS: | | | | | |
| (%) By Weight | 0.34 | 0.067 | 0.039 | 0.036 | 0.026 |
| % Change | — | −80% | −88% | −89% | −92% |

Again, as shown in the examples of Table 2, significant and unexpected gains in strength, flexural rigidity, and debris reduction were obtained out of proportion to the small amount of binder used.

Table 3 illustrates a hydroentangled (HEF) liner, made from 50% rayon fibers and 50% polyester fibers, having no binder treatment versus treatment with an SBR binder.

TABLE 3

PHYSICAL PROPERTIES OF HYDROENTANGLED (HEF) LINER

|  | Control | 1.5% SBR |
|---|---|---|
| WEIGHT: | | |
| (g/sq. yd) | 30 | 30 |
| % Change | — | — |
| TENSILE STRENGTH: | | |
| MD (lb/in) | 7.3 | 8.4 |
| % Change | — | 15% |
| CD (lb/in) | 1.16 | 1.46 |
| % Change | — | 26% |
| FLEX. RIGIDITY: | | |
| (Mg-cm) | 39 | 12 |
| % Change | — | 226% |
| DEBRIS: | | |
| (%) By Weight | 0.066 | 0.037 |
| % Change | — | −44% |
| DIMENSIONAL STABILITY: | | |
| (force required to elongate by 1%) | | |
| MD (lbs) | 0.20 | 0.85 |
| % Change | — | 325% |
| CD (lbs) | 0.09 | 0.39 |
| % Change | — | 333% |

Again, in the HEF examples of Table 3, significant and unexpected gains in strength, flexural rigidity, and debris reduction were obtained out of proportion to the small amount of binder used. Tests for dimensional stability of the resulting HEF liner also showed a tripling of this property for the test fabric. In the past, HEF fabric was not considered suitable for use as diskette liners due to their low dimensional stability which made them very difficult to cut and handle on assembly equipment. However, with the treatment of low levels of binder, as shown above, the dimensional stability of the hydroentangled fabric is increased dramatically so that it can now be used in the diskette application.

Figure 4:
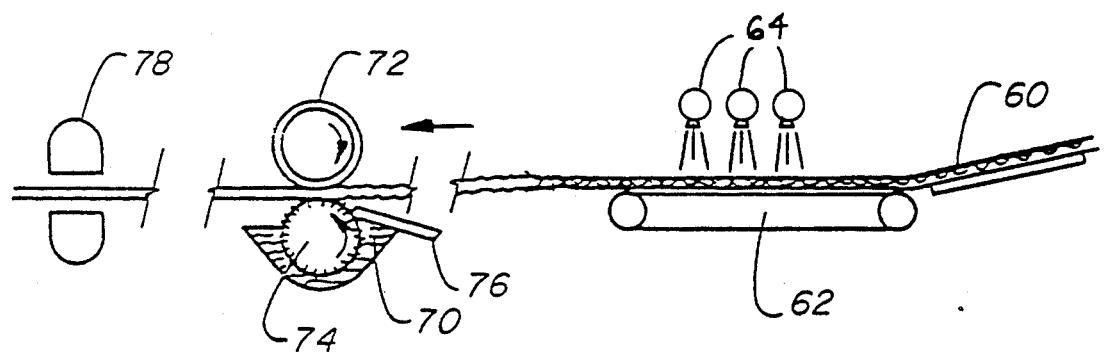
FIG. 4 is an illustration of a method for producing a hydroentangled diskette liner impregnated with binder in accordance with the present invention.

Referring now to FIG. 4, an illustration of a method and arrangement for producing the HEF fabric for diskette liner is shown. Initially, a fibrous web 60 comprising a loose matrix of fibers is formed by carding, air laying or the like. Besides cellulosic fibers, the matrix can be comprised of conventional or textile grade staple length synthetic fibers. The fibers typically have a denier in the range of 0.5-6 and a length of a half inch to several inches. A mixture of more than one type of fiber can be used, and the relative proportion of the fibers is not of critical significance. The weight and density of the fibrous web is also not of critical importance. Web weights in the range of 15-90 grams per square yard may be used. The web 60 of loose fibers is transported on an endless belt 62 under a series of water-jet manifolds 64 which serve to entangle the fibers with each other under fluid force.

The water is substantially removed from the web, and a binder solution 70 is applied by passing the hydroentangled fabric between an elastomer roller 72 and an etched steel roller 74 half immersed in the binder solution. The steel roller 74 transports the binder solution to the fabric while the elastomer roller 72 squeezes the solution with an even pressure throughout the fabric thickness. A doctor blade 76 removes excess solution. The wet pickup is about 100% by weight. The binder-impregnated fabric is then dried off at a drying station 78.

The binder may be applied to the fabric by other techniques such as spraying. During the fabrication process, the fabric is substantially cleaned and removed of contaminants, such as fibrous debris and small particulates, by the fluid treatment. A high surface tension in the binder solution is desirable to allow the binder solution to bead on the fiber during drying-off and collect at the junction points of the fiber. This technique of concentrating the binder at the junction points of the fiber by surface tension beading is ideal from a structural engineering perspective because it makes the most efficient use of the binder. This results in higher tensile strengths and lower debris. The data in Table 4 demonstrates this by comparing the physical properties of a 75% rayon and 25% polypropylene (thermally bonded) nonwoven that was surface treated with a binder solution having low surface tension (by adding a surfactant) versus one having high surface tension (no surfactant).

ring. The latex binder used was a styrene butadiene rubber polymer sold under the name GenFlo 3003, manufactured by GenCorp Polymer Products of Mogadore, Ohio. The surfactant used was Triton X100 manufactured by the Rohm and Haas Company of Edison, N.J.

As shown in the above examples, the liner strength and debris reduction were significantly improved using the high surface tension binder solution as compared to the low surface tension solution having the same level of binder. For example, the tensile strength was increased 100% with the high surface tension solution as compared to 43% with the low surface tension solution. Also, the debris was reduced by 91% versus 67%. Since a high surface tension solution is preferred, only a low level of surfactant or no surfactant at all need be employed in the binder solution. The absence of high levels of surfactant reduces the risk of chemical attack from the liner on the disk media. Also, since only a small transition temperature may be used, thereby providing greater durability.

The production of typical hydroentangled fabric for 3.5" diskette liner is now described in more detail. As an example, the HEF fabric has a fiber composition of 50% solvent-spun cellulosic fiber of 1.5 denier and 1.5" length, and 50% polyester fiber of 1.5 denier and 1.5" length, and is treated with 1.0% by weight of an SBR latex binder. The fibers to make the base fabric are homogeneously blended, opened and then combed by a dry carding process to form a web. The web is transferred on a conveyor under several high pressure water jet manifolds. The jets in a typical manifold are 0.005 inches in diameter and spaced 60 jets per inch. Three manifolds are used on the top surface of the web and exert 400, 500 and then 600 psi while the web is supported by a flat fine mesh screen. The web is then transferred to a drum covered with a 100×94 mesh screen where three additional water jet manifolds exert 700, 800 and finally 900 psi onto the bottom surface of the web. A fabric weight of 30 grams per square yard combined with a line speed of 75 feet per minute and the manifold pressures listed above yield an energy level applied to the structure of 0.66 horsepower-hours per pound of fabric.

The hydroentangled fabric is then post-treated through a gravure type printer that nips the fabric between an engraved roll that transfers a dilute binder solution and a soft elastic roll. The dilute binder solution contains an SBR latex with no added surfactants. The fabric is then dried through a series of steam cans and wound onto a roll.

For a typical hydroentangled fabric for use as 5.25" diskette liner, the fiber composition is 100% viscose rayon fiber of 1.5 denier and 1 9/16" length. The hydro-

TABLE 4

| LOW/HIGH SURFACE TENSION BINDER TREATMENT OF LINER | | | |
|---|---|---|---|
| | Control | 1.5% SBR Only | 1.5% SBR, 1% Surfactant |
| SURFACE TENSION: (dynes/cm) | — | 67 | 38 |
| TENSILE STRENGTH: | | | |
| MD (lb/in) | 3.0 | 6.0 | 4.3 |
| % Change | — | 100% | 43% |
| DEBRIS: | | | |
| (%) By Weight | 0.34 | 0.030 | 0.111 |
| % Change | — | −91% | −67% |

The surface tension of the binder solution in the above example was measured with a 6 cm film-forming entanglement process to form the base fabric is essentially the same as that described for the 3.5" diskette liner, except that after the fabric is hydroentangled, it is post treated with 3.5% by weight of an SBR latex binder, dried, and then further treated with 0.5% by weight of an antistatic material.

Hydroentangled fabrics (HEF) have several advantages over thermally-bonded fabrics as currently used for diskette liners:

1. HEF liners more efficiently clean the magnetic media surface of small particles that cause errors. This is because they have more surface area available for cleaning compared to the standard thermally spot bonded nonwovens that have approximately 25% of their surface recessed below the cleaning surface.

2. HEF liners have less debris than the standard thermally spot bonded nonwovens. The fibers in the thermally bonded structures are severely stressed around the perimeter of the bond spots and these stressed fibers eventually break off as debris. Thermal bonded liners inherently have this broken fiber debris problem whereas HEF liners do not.

3. HEF liners contain less environmental contaminants since they are washed off during the water entanglement process. These contaminants such as silica and calcium compounds cause errors on magnetic media.

4. HEF liners are substantially loftier than thermally bonded structures. Loftier structures clean magnetic media more efficiently and they may help to dampen the flutter of the media as it rotates in the disk and therefore promote compliance between the read/write head and the media.

5. HEF liners cut cleaner than standard thermally bonded liners when the HEF liner is dimensionally stabilized. HEF liners can be dimensionally stabilized by several techniques, including the following (alone or in combination):

(a) Adding low levels of binder after the initial bonding of the HEF structure. Typically a 0.5 to 3% binder range is used but this could be as broad as 0.1 to 10%.

(b) Using solvent spun cellulosic fibers, which adds considerable dimensional stability to the HEF structure. Solvent spun cellulosic fibers are currently manufactured by Courtaulds Fibers Inc., Coventry, U.K., and by Lenzing AG, an Austrian company. The generic name for solvent-spun viscose rayon is "LYOCELL". Courtaulds uses the trade name "TENCEL" for its product. The high modulus of the fiber appears to be a major contributing factor.

(c) Incorporating scrim or paper in the web structure before entanglement.

(d) Stretching the fabric (i.e., in a tenter frame) after the initial HEF bonding.

Several comparison examples of the advantageous properties of HEF liners are presented in detail (including the example in Table 3 above) to illustrate the above points. Table 5 below compares the current type of thermally bonded liners to HEF liners for 3.5" diskettes.

TABLE 5

| COMPARISON OF THERMALLY BONDED LINERS TO HEF LINERS | | | |
| --- | --- | --- | --- |
| BONDING METHOD: | thermal | thermal | hydroentanglement plus 1.5% binder |
| FIBER COMP.: | 50% rayon 50% polyester | 80% rayon 20% nylon | 50% rayon 50% polyester |
| WEIGHT: | 28 gsy | 36 gsy | 24 gsy |
| THICKNESS: | | | |
| 186 g/sq. cm. load | 188 microns | 220 microns | 211 microns |
| 4.4 g/sq. cm. load | 237 microns | 275 microns | 372 microns |
| SPEC. VOLUME: (4.4 g/sq. cm. load) | 7.1 cc/g | 6.4 cc/g | 13 cc/g |
| TENSILE STRENGTH: | | | |
| MD | 3.3 lb/in | 6.0 lb/in | 7.4 lb/in |
| DEBRIS: | 0.06% | 0.08% | 0.04% |

As shown above, significant and unexpected improvements were obtained for HEF liners in terms of specific volume or loft as well as debris reduction. The loftiness of the HEF fabric structure (as measured with a low loading thickness gauge and reported as specific volume) is essentially double that of thermally bonded diskette liners. The loftiness of the structure contributes to cleaning of the magnetic media surface as well as promotes compliance between the read/write head and the media.

The debris level of the HEF fabric also shows a 50% improvement over the thermally bonded material made with the same fibers (50% rayon and 50% polyester) and 100% improvement compared to that of other thermally bonded fibers (80% rayon and 20% nylon).

The next example illustrates the significant improvements gained by using solvent spun cellulosic fibers (Tencel) as a substitute for conventional viscose rayon fibers in the HEF structure. The two fabric samples are identical except for the cellulosic fiber.

TABLE 6

| HEF LINERS HAVING SOLVENT SPUN CELLULOSIC FIBERS | | |
| --- | --- | --- |
| BONDING METHOD: | hydroentanglement plus 1.5% binder | hydroentanglement plus 1.5% binder |
| FIBER COMPOSITION: | 50% viscose rayon 50% polyester | 50% cellulosic (Tencel) 50% polyester |
| WEIGHT: | 24 gs | 24 gsy |
| TENSILE STRENGTH: | | |
| MD | 7.4 lb/in | 9.6 lb/in |
| CD | 1.6 lb/in | 2.2 lb/in |
| DIMENSIONAL STABILITY: (force to elongate by 1%) | | |
| CD | 0.008 lbs | 0.04 lbs |

| TABLE 6-continued | | |
|---|---|---|
| HEF LINERS HAVING SOLVENT SPUN CELLULOSIC FIBERS | | |
| % increase | — | 400% |

In addition to the marked improvements obtained in tensile strength with the Tencel fibers, the most important advance in regard to the diskette liner application is the dramatic increase of 400% in the HEF fabric's dimensional stability.

Clean cutting is another important attribute of the diskette liner. If a liner fabric has protruding fibers at its edges, the fibers can become caught in the read/write slot of the diskette between the magnetic media and the read/write head, and will cause an error in the transfer of information.

Figure 5A:
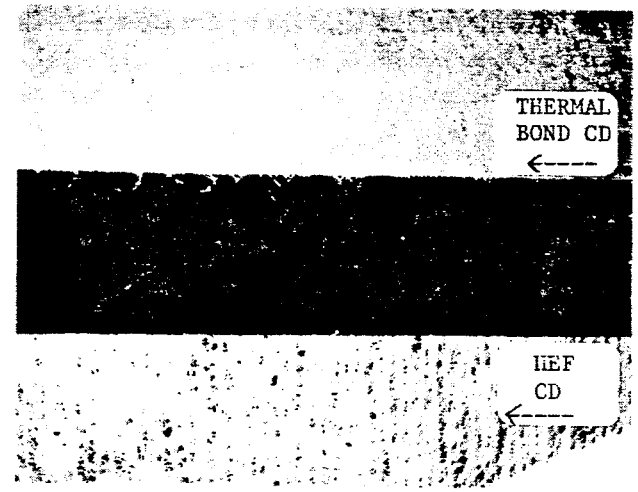
FIGS. 5A and 5B are photographs showing a comparison of the cleanliness of the cut edges of hydroentangled liner fabric as compared to thermally bonded fabric.
Figure 5B:
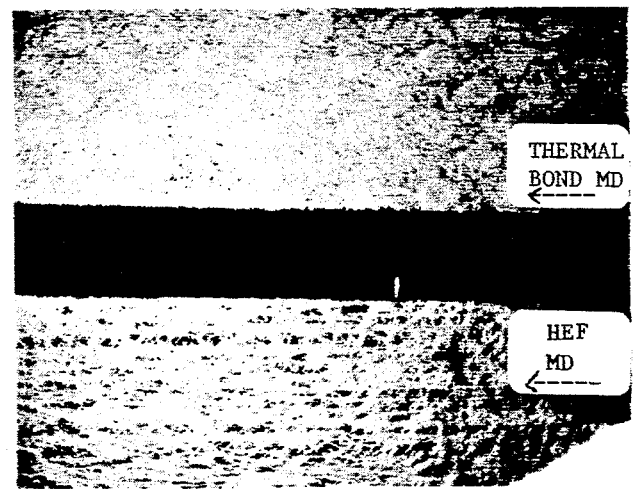

The photographs in FIGS. 5A and 5B illustrate the cleanliness of the cut edges of the new HEF fabric liners as compared to the best thermally bonded structures. The die-cut edges of the two types of fabrics are shown in both the MD and CD directions. Although these fabrics were cut with the same method and with the same die, the HEF liner displays a much cleaner cut with significantly less fibers protruding from the edges.

For the HEF liners, a synergistic effect is also obtained wherein a relatively small amount of binder evenly distributed in the liner fabric provides a large increase in strength and stiffness (for handleability) and a large reduction in debris from the liner. The technique of using low-surfactant binder solution having a high surface tension allows the binder to bead to the fiber crossover points where they will have the greatest effect. This effect also allows hydroentangled fabric to obtain an increase in dimensional stability and flexural rigidity so that it can be used for liner applications.

Although the invention has been described with reference to certain modes and preferred embodiments, it will be appreciated that many variations and modifications may be made based upon an understanding of the disclosed principles of the invention. All such modes, embodiments, variations, and modifications are nevertheless intended to be within the scope of the invention as defined in the following claims.

I claim:

1. A diskette liner, for use in cleaning the surface of a disk recording medium, comprising a nonwoven fabric made of fibers which are hydroentangled together and impregnated with a small amount of binder that is applied as a solution to the fabric and has its fluid content removed by drying such that the binder is collected at junction points of the fibers and is substantially uniformly distributed throughout the fibers of the fabric in at least a minimum amount, and no more than 5% by weight of the fabric, which is sufficient to achieve said uniform distribution of the binder at the junction points of the fibers.

2. The diskette liner of claim 1, wherein said binder is applied in the range of 1.5%–3.0% by weight of the fabric.

3. The diskette liner of claim 1, wherein said binder is selected from the group consisting of styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA), polyvinyl alcohol, polyester (PET) and copolymers, a elastomeric adhesives.

4. The diskette liner of claim 1, wherein said hydroentangled fibers are staple length fibers of one or more of the group consisting of polypropylene, polyester, nylon, acrylic, cellulose acetate, rayon, cotton, wool, or bicomponent fibers or combinations thereof, or other synthetic or natural fibers.

5. The diskette liner of claim 1, wherein said fibers have a composition of about 50% rayon fibers and 50% polyester fibers.

6. The diskette liner of claim 1, wherein said fibers have a composition of about 50% solvent spun cellulosic fibers and 50% polyester fibers.

7. The diskette liner of claim 1, wherein said fibers have a composition of substantially 100% viscose rayon fibers.

8. The diskette liner of claim 1, wherein said hydroentangled fabric with a small amount of binder uniformly distributed therein has a flexural rigidity of more than 200% greater than the hydroentangled fabric without the binder.

9. The diskette liner of claim 1, wherein said hydroentangled fabric with a small amount of binder uniformly distributed therein has a tensile strength of more than 300% greater than the hydroentangled fabric without the binder.

10. The diskette liner of claim 1, wherein said hydroentangled fabric with a small amount of binder uniformly distributed therein has a fiber debris level reduced by more than 40% less than the hydroentangled fabric without the binder.

11. The diskette liner of claim 1, wherein said hydroentangled fabric with a small amount of binder uniformly distributed therein has a specific volume (loftiness) two times or more greater than thermally bonded fabric of the same fiber and binder composition.

12. The diskette liner of claim 1, wherein said hydroentangled fabric with a small amount of binder uniformly distributed therein has a tensile strength of two times or more greater than thermally bonded fabric the same fiber and binder composition.

13. The diskette liner claim 1, wherein said hydroentangled fabric with a small of binder uniformly distributed therein has a debric of about 50% less than thermally bonded fabric of the same binder composition.

14. The diskette liner of claim 1, wherein said binder has substantially no surfactant therein as to have a high surface tension wherein the binder becomes co at junction points of the fibers of the fabric.

15. The diskette liner claim 1, wherein said hydroentangled fabric with a small of binder uniformly distributed therein has a fiber of 50% solvent spun cellulosic fibers and 50% polyester a tensile strength of about three times greater than thermally bonded fabric having a fiber composition of 50% rayon and polyester fibers and the same binder composition.

16. The diskette liner claim 1, wherein said hydroentangled fabric with a small of binder uniformly distributed therein has a fiber of 50% solvent spun cellulosic fibers and 50% polyester, and has a dimensional stability of about 400% greater than fabric having a fiber composition of 50% viscose and 50% polyester fibers and the same binder composition.

17. A method of fabricating a diskette liner material, for use in cleaning the surface of a disk recording medium, comprising the steps of:
   hydroentangling a web of loose fibers such that the are interentangled with each other to have a desired high density of fiber junction points;
   applying a binder solution to the hydroentangled fibers having a high surface tension and a low concentration of binder, such that the binder when dried does not constitute more than 5% by weight of the finished fabric;
   allowing the binder solution, due to its high surface tension, to bead on and be retained at the junction points of the fibers; and
   drying the fluid content from the binder solution such that the binder becomes collected at the junction points of the fibers and is substantially uniformly distributed throughout the fibers of the fabric, such that said hydroentangled fabric has a concentration of binder uniformly distributed therein, including at a side thereof to be placed in contact with the disk recording medium, of no more than 5% by weight of the binder-impregnated fabric, wherein the fabric has an improved dimensional stability by the low concentration of binder being collected at the fiber junction points without any mechanical bonding of the fabric.

18. The method of fabricating a diskette liner material of claim 17, wherein said binder is applied in the range of 1.5%-3.0% by weight of the fabric.

19. The method of fabricating a diskette liner material of claim 17, wherein said binder has substantially no surfactant therein so as to have a high surface tension wherein the binder becomes concentrated at the junction points of the fibers of the fabric.

20. An improved diskette cartridge of the type having opposing outer wall members, a rotatable disk recording medium having at lest one surface for recording information thereon retained between said outer wall members, and at least one liner placed between one of said wall members in contact with said recording medium for cleaning thereof, wherein the improvement comprises said liner being formed of a nonwoven fabric made of fibers which are hydroentangled together and impregnated with a small amount of binder that is applied as a solution to the fabric and has its fluid content removed by drying such that the binder is collected at junction points of the fibers and is substantially uniformly distributed throughout the fibers of the fabric in at least a minimum amount, and no more than 5% by weight of the fabric, which is sufficient to achieve said uniform distribution of the binder at the junction points of the fibers.

* * * * *

UNITED STATES PATENT AND TRADEMARK OFFICE
CERTIFICATE OF CORRECTION

PATENT NO. : 5,311,389

DATED : May 10, 1994

INVENTOR(S) : Jon A. Howey

It is certified that error appears in the above-identified patent and that said Letters Patent is hereby corrected as shown below:

In column 3, line 38, change "or" to --of--.
In column 4, line 24, change "a" to --at--.
In column 6, Table 3, line 35, change "12" to --127--.
In column 8, line 20, insert --amount of binder is present in the fabric, binders of glass-- after "small".
In column 10, Table 6, second column, change "24 gs" to --24 gsy--.
In claim 3, line 66, change "a" to --and--.
In claim 12, line 45, insert --of-- after "fabric".
In claim 13, line 47, insert --of-- after "liner";
    line 48, insert --amount-- after "small";
    line 49, insert --reduction-- after "debric" and change "debric" to --debris--;
    line 50, insert --fiber and-- after "same".
In claim 14, line 52, insert --so-- after "therein";
    line 53, change "co" to --concentrated--.
In claim 15, line 55, insert --of-- after "liner";
    line 56, insert --amount-- after "small";
    line 57, insert --composition-- after "fiber;
    line 58, insert --, and has-- after "polyester";
    line 60, insert --50%-- before "polyester".

UNITED STATES PATENT AND TRADEMARK OFFICE
CERTIFICATE OF CORRECTION

PATENT NO. : 5,311,389
DATED : May 10, 1994
INVENTOR(S) : Jon A. Howey

It is certified that error appears in the above-identified patent and that said Letters Patent is hereby corrected as shown below:

```
    In claim 16, line 62, insert --of-- after "liner";
                 line 63, insert --amount-- after "small";
                 line 66, insert --hydroentangled-- before
"fabric";
                 line 67, insert --rayon-- after "viscose".
    In claim 20, line 11, change "lest" to --least--.
```

Signed and Sealed this

First Day of November, 1994

Attest:

BRUCE LEHMAN

Attesting Officer

Commissioner of Patents and Trademarks